(12) United States Patent
Otani et al.

(10) Patent No.: US 11,060,610 B2
(45) Date of Patent: Jul. 13, 2021

(54) MULTISTAGE SHAFT SEALING APPARATUS AND ROTARY MACHINE

(71) Applicant: MITSUBISHI HEAVY INDUSTRIES, LTD., Tokyo (JP)

(72) Inventors: Takanobu Otani, Tokyo (JP); Hiroshi Kuzumi, Tokyo (JP); Hiroyuki Tokumasu, Tokyo (JP); Toshihiko Matsuo, Tokyo (JP); Yasuhiro Ikeda, Tokyo (JP); Hitoshi Ito, Tokyo (JP); Yasushi Takayama, Tokyo (JP); Tomoki Hanada, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 98 days.

(21) Appl. No.: 16/270,090

(22) Filed: Feb. 7, 2019

(65) Prior Publication Data

US 2019/0301607 A1    Oct. 3, 2019

(30) Foreign Application Priority Data

Mar. 29, 2018   (JP) .............................. JP2018-063460

(51) Int. Cl.
*F16J 15/00*   (2006.01)
*F16J 15/44*   (2006.01)

(52) U.S. Cl.
CPC ........... *F16J 15/002* (2013.01); *F16J 15/441* (2013.01)

(58) Field of Classification Search
CPC ......... F16J 15/002; F16J 15/441; F16J 15/16; F16J 15/164; F16J 15/008

(Continued)

(56) References Cited

U.S. PATENT DOCUMENTS

| 8,356,972 B2 * | 1/2013 | Howard | F16J 15/164 |
| | | | 415/136 |
| 8,955,850 B2 * | 2/2015 | Saucerman | F16J 15/322 |
| | | | 277/549 |

(Continued)

FOREIGN PATENT DOCUMENTS

| JP | 63-022397 U | 2/1988 |
| JP | 2009-275900 A | 11/2009 |

(Continued)

OTHER PUBLICATIONS

International Search Report dated May 14, 2019, issued in counterpart Application No. PCT/JP2019/011284 (11 pages).

*Primary Examiner* — Nathan Cumar
(74) *Attorney, Agent, or Firm* — Westerman, Hattori, Daniels & Adrian, LLP

(57) ABSTRACT

A multistage shaft sealing apparatus includes a first sealing unit, a second sealing unit, and a third sealing unit provided, in a sequential order from a side of the apparatus closer to inside of the apparatus, in a fluid leakage passage formed between the rotating shaft or the rotating member and a housing located to surround the rotating shaft or the rotating member. The first sealing unit includes a first runner and a first sealing ring which form a non-contact-type sealing surface; the second sealing unit includes a second runner and a second sealing ring which form a contact-type sealing surface; the third sealing unit includes a third runner and a third sealing ring which form a contact-type sealing surface, and a purge water supply passage supplying purge water to the third sealing unit and a purge water discharge passage discharging the purge water supplied to the third sealing unit.

8 Claims, 2 Drawing Sheets

(58) Field of Classification Search
USPC .......................................................... 277/350
See application file for complete search history.

(56) References Cited

U.S. PATENT DOCUMENTS

| | | | | |
|---|---|---|---|---|
| 2007/0140877 | A1* | 6/2007 | Sanville | F04D 7/08 |
| | | | | 417/423.11 |
| 2014/0271288 | A1* | 9/2014 | Hawkins | F04D 15/0066 |
| | | | | 417/423.11 |
| 2015/0050141 | A1* | 2/2015 | Savin | F04D 29/146 |
| | | | | 415/230 |
| 2015/0108721 | A1* | 4/2015 | Thuillier | F16J 15/54 |
| | | | | 277/522 |
| 2015/0192142 | A1* | 7/2015 | Philippart | F04D 7/08 |
| | | | | 415/47 |
| 2015/0221400 | A1* | 8/2015 | Saeki | F16J 15/3272 |
| | | | | 376/203 |
| 2016/0010749 | A1* | 1/2016 | Kafuku | F16J 15/164 |
| | | | | 277/578 |

FOREIGN PATENT DOCUMENTS

| | | |
|---|---|---|
| JP | 2014-080961 A | 5/2014 |
| JP | 2014-181752 A | 9/2014 |
| WO | 2015/011812 A1 | 1/2015 |

\* cited by examiner

MULTISTAGE SHAFT SEALING APPARATUS AND ROTARY MACHINE

TECHNICAL FIELD

This disclosure relates to a multistage shaft sealing apparatus handling a high-temperature and high-pressure fluid and a rotary machine including the multistage shaft sealing apparatus.

BACKGROUND

For example, at a nuclear power plant, a primary coolant pump is provided between a nuclear reactor and a steam generator in order to circulate a primary coolant. The primary coolant pump is equipped with a sealing apparatus to prevent leakage of the primary coolant from around a pump shaft.

Patent Literature 1 discloses a sealing apparatus provided in a primary coolant pump. This sealing apparatus is composed of a first sealing unit, a second sealing unit, and a third sealing unit which are located around a pump shaft in a sequential order from the side closer to inside of the apparatus (for example, from a pump room side). Patent Literature 1 describes that the first sealing unit has a non-contact-type sealing surface and each of a second sealing unit and a third sealing unit has a contact-type sealing surface.

For example, regarding the primary coolant pump, intrusion of a high-temperature and high-pressure primary coolant into a sealing unit is prevented by injecting sealing water into an inlet of the sealing unit during normal operation. However, when a station blackout (hereinafter sometimes referred to as "SBO") occurs, there is a possibility that the injection of the sealing water may stop and the high-temperature and high-pressure primary coolant may leak out of the apparatus. As a countermeasure for this, Patent Literature 1 is equipped with a shutdown seal for emergency purposes to shut down a fluid leakage passage in reaction to the temperature of the sealing water which has become high.

CITATION LIST

Patent Literature

Patent Document 1: U.S. Pat. No. 8,356,972

SUMMARY

Regarding Patent Literature 1, the sealing unit is equipped with the shutdown seal as a new sealing mechanism and, therefore, there are problems of the complicated configuration of the sealing units and high cost.

Conventionally, the contact-type sealing surface is configured, despite what it is called, so that when the pressure of an upstream side of the sealing surface becomes relatively high, leakage is normally allowed to avoid the pressure of the upstream side from becoming excessively high. Patent Literature 1 describes that each of the second sealing unit 40 and the third sealing unit 42 has the contact-type sealing surface, but a leak-off port 71 for discharging the injected sealing water is provided in the second sealing unit 40 and the third sealing unit 42 (see column 5, lines 1 to 3 and FIG. 2). Accordingly, it is assumed that the above-described configuration is formed.

In light of the above-described problems, it is an object of one embodiment to prevent leakage of the high-temperature and high-pressure fluid to outside of the apparatus by a simple means without using the shutdown seal even upon emergency such as the occurrence of an SBO when the injection of the sealing water has stopped.

(1) A multistage shaft sealing apparatus according to one embodiment is a multistage shaft sealing apparatus provided on an outer peripheral side of a rotating shaft or a rotating member that rotates with the rotating shaft and the multistage shaft sealing apparatus includes a first sealing unit, a second sealing unit, and a third sealing unit that are provided, in a sequential order from a side of the apparatus closer to inside of the apparatus, in a fluid leakage passage generated between the rotating shaft or the rotating member and a housing located to surround the rotating shaft or the rotating member, wherein the first sealing unit is configured by including a first runner secured to the rotating shaft or the rotating member and a first sealing ring that is secured to the housing and forms a non-contact-type sealing surface with the first runner;

wherein the second sealing unit is configured by including a second runner secured to the rotating shaft or the rotating member and a second sealing ring that is secured to the housing and forms a contact-type sealing surface with the second runner; and wherein the third sealing unit is configured by including a third runner secured to the rotating shaft or the rotating member and a third sealing ring that is secured to the housing and forms a contact-type sealing surface with the third runner; and the third sealing unit further includes:

a purge water supply passage supplying purge water to the third sealing unit; and a purge water discharge passage discharging the purge water supplied to the third sealing unit.

According to the above-described configuration (1), the first sealing unit forms the non-contact-type sealing surface, so that when the fluid flows through the sealing surface, the pressure of the fluid is reduced sufficiently. Consequently, the second sealing unit does not have to assume a pressure reduction action and can thereby prevent leakage by adopting the contact-type sealing surface. In this way, the second sealing unit can substantially prevent leakage of any fluid leaked from the first sealing unit, so that the leaked fluid will not reach the third sealing unit. The purge water is supplied from the purge water supply passage to the third sealing unit and this purge water lubricates and cools down the sealing surface, so that a sealing function can be maintained. Furthermore, since the third sealing unit has the contact-type sealing surface, it can prevent leakage of any leaked fluid if by any chance such leaked fluid should reach the third sealing unit.

As a result, the leakage of the high-temperature and high-pressure fluid from the sealing units can be prevented by the second sealing unit even when the injection of the sealing water has stopped upon emergency such as the occurrence of an SBO, so that it is unnecessary to provide a shutdown seal for emergency purposes. Therefore, the configuration of the sealing units can be simplified and costs can be controlled to achieve low costs.

(2) One embodiment in the configuration (1) described above further includes:

a sealing water injection passage supplying sealing water to the fluid leakage passage at a position closer to the inside of the apparatus than the first sealing unit; and a sealing water discharge passage provided so as to communicate with the fluid leakage passage between the first sealing unit and the second sealing unit.

According to the above-described configuration (2), the sealing water is injected from the sealing water injection passage at the position closer to the inside of the apparatus than the first sealing unit during the normal operation, so that it is possible to prevent the fluid inside the apparatus from flowing into the sealing unit. Furthermore, since the sealing water discharge passage for discharging the sealing water from the housing is provided between the first sealing unit and the second sealing unit, the sealing water can be discharge to outside of the housing without passing through the contact-type sealing surface of the second sealing unit.

(3) According to one embodiment in the above-described configuration (1) or (2), the contact-type sealing surface formed at the second sealing unit and the third sealing unit is configured so that the contact-type sealing surface will not let a fluid pass through at least during normal operation.

A sealing surface pressure which is generated at the contact-type sealing surface formed between the runner and the sealing ring is normally determined based on, for example, the difference in pressures between the upstream side and the downstream side of the sealing surface and a pressing formed applied to the runner or the sealing ring. Then, a sealing effect is influenced by a degree of the sealing surface pressure.

According to the above-described configuration (3), the leakage of the fluid can be prevented by the second sealing unit and the third sealing unit, each of which has the contact-type sealing surface, during the normal operation and also the leakage of the high-temperature and high-pressure fluid can be prevented by the second sealing unit even when the injection of the sealing water has stopped upon emergency such as the occurrence of an SBO.

(4) According to one embodiment in any one of the above-described configurations (1) to (3), the contact-type sealing surface formed at the second sealing unit is configured so that when a temperature of a fluid reaching the sealing surface is 310☐ or lower and a pressure of the fluid is 17.5 MPa or less, a flow rate of the fluid passing through the sealing surface becomes 1 m³/hr or less.

According to the above-described configuration (4), the second sealing unit is configured so that when the temperature of the fluid is 310☐ or lower and the pressure of the fluid is 17.5 MPa or less, the flow rate of the fluid passing through the sealing surface becomes 1 m³/hr or less. Therefore, even when the high-temperature and high-pressure fluid reaches the second sealing unit, the leakage of that fluid can be prevented.

(5) According to one embodiment in any one of the above-described configurations (1) to (4), the second sealing unit does not include a bypass path that bypasses the second sealing unit and couples the fluid leakage passage upstream from the second sealing unit to the fluid leakage passage downstream from the second sealing unit so as to allow communication between them.

The pressure of the fluid is sufficiently reduced by the first sealing unit as described earlier. So, even when the second sealing unit has the contact-type sealing surface, an excessively high pressure will not occur at the upstream side of the second sealing unit. Therefore, it is unnecessary to provide the above-described bypass path for bypassing the second sealing unit.

(6) One embodiment in any one of the above-described configurations (1) to (5) does not include a shutdown seal that operates to close the fluid leakage passage in response to a temperature or pressure of a fluid flowing into the fluid leakage passage when the temperature or pressure of the fluid reaches a certain temperature or pressure or higher.

According to the above-described configuration (6), the leakage of the high-temperature and high-pressure fluid from the sealing units can be prevent by the second sealing unit as described earlier even when the injection of the sealing water has stopped upon emergency such as the occurrence of an SBO, so that it is unnecessary to include the shutdown seal. Therefore, the configuration of the sealing units can be simplified and costs can be controlled to achieve low costs.

(7) One embodiment in any one of the above-described configurations (1) to (6) further includes an O-ring provided between the rotating shaft or the rotating member and the first sealing unit, the second sealing unit, or the third sealing unit or between constituent elements that constitute the first sealing unit, the second sealing unit, or the third sealing unit, wherein the O-ring is composed of a heat-resistant material.

According to the above-described configuration (7), the O-ring interposed between the respective members and the respective constituent elements is composed of the heat-resistant material, so that it is possible to maintain the effect of preventing the leakage of the high-temperature and high-pressure fluid between the respective members and the respective constituent elements.

(8) A rotary machine according to one embodiment includes:

a rotating shaft; and the multistage shaft sealing apparatus having any one of the above-described configurations (1) to (7) and provided on the outer peripheral side of the rotating shaft or a rotating member that rotates with the rotating shaft.

According to the above-described configuration (8), the rotary machine includes the multistage shaft sealing apparatus having the aforementioned configuration. So, the leakage of the high-temperature and high-pressure fluid from the sealing units can be prevented by the second sealing unit even when the injection of the sealing water has stopped upon emergency such as an SBO. Therefore, it becomes unnecessary to provide the shutdown seal, so that the configuration of the sealing units can be simplified and costs can be controlled to achieve low costs.

According to some embodiments, the leakage of the high-temperature and high-pressure fluid to outside of the apparatus can be prevented by a simple means even upon emergency such as the occurrence of an SBO when the injection of the sealing water has stopped.

DETAILED DESCRIPTION

Figure 1:
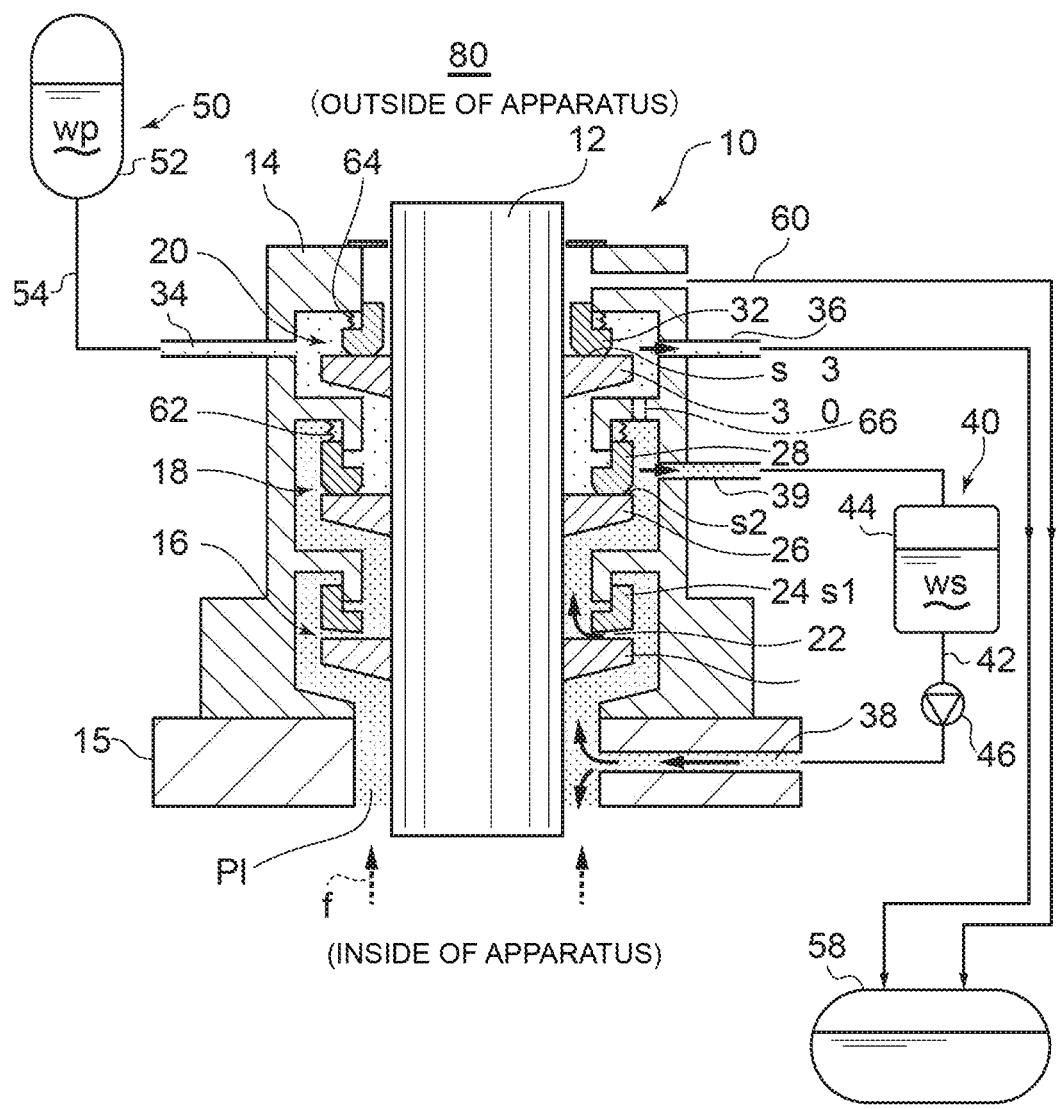
FIG. 1 is a longitudinal sectional view schematically illustrating a rotary machine equipped with a multistage shaft sealing apparatus according to one embodiment.

Embodiments of the present invention will now be described in detail with reference to the accompanying drawings. It is intended, however, that unless particularly specified, dimensions, materials, shapes, relative positions and the like of components described in the embodiments or illustrated in the drawings shall be interpreted as illustrative only and not limitative of the scope of the present invention.

For example, expressions representing relative or absolute positioning such as "in a certain direction," "along a certain direction," "parallel," "perpendicular to," "center," "concentric," or "coaxial" not only strictly represent such arrangement, but also represent a state where its position is relatively changed within tolerance or by an angle or distance of some degree that allows to obtain the same function.

For example, expressions representing a state where things are equal such as "the same," "equal," and "homogeneous" not only represent a strictly equal state, but also represent a state where there is a tolerance or a difference of some degree that allows to obtain the same function.

For example, expressions representing shapes such as a quadrangular shape and a cylindrical shape not only represent the shapes of, for example, the quadrangular shape and the cylindrical shape in a geometrically strict sense, but also represent shapes including protrusions, recesses, chamfered parts, etc. within a range capable of obtaining the same effects.

Meanwhile, expressions such as "comprise/comprising," "contain/containing," "be equipped with," "include/including," or "have/having" one constituent element are not exclusive expressions that exclude the existence of other constituent elements.

FIG. 1 is a longitudinal sectional view schematically illustrating a multistage shaft sealing apparatus 10 according to one embodiment.

Referring to FIG. 1, the multistage shaft sealing apparatus 10 is provided on an outer peripheral side of a rotating shaft 12. The multistage shaft sealing apparatus 10 includes a first sealing unit 16, a second sealing unit 18, and a third sealing unit 20 that are provided, in a sequential order from a side of the apparatus closer to inside of the apparatus, in a fluid leakage passage Pl generated between the rotating shaft 12 and a housing 14 located so as to surround the rotating shaft 12.

According to one embodiment, a rotating member (not illustrated in the drawing) such as a sleeve which rotates with the rotating shaft 12 is provided on an outer peripheral surface of the rotating shaft 12. When this rotating member is included, the fluid leakage passage Pl is generated between this rotating member and the housing 14 and the first sealing unit 16, the second sealing unit 18, and the third sealing unit 20 are provided on an outer peripheral side of the rotating member to face the fluid leakage passage Pl.

The first sealing unit 16 is configured by including a first runner 22 secured to the outer peripheral surface of the rotating shaft 12 and a first sealing ring 24 which is secured to the housing 14 and forms a non-contact-type sealing surface s1 with the first runner 22.

The second sealing unit 18 is configured by including a second runner 26 secured to the outer peripheral surface of the rotating shaft 12 and a second sealing ring 28 which is secured to the housing 14 and forms a contact-type sealing surface s2 with the second runner 26.

The third sealing unit 20 is configured by including a third runner 30 secured to the rotating shaft 12 and a third sealing ring 32 which is secured to the housing 14 and forms a contact-type sealing surface s3 with the third runner 30.

Furthermore, the third sealing unit 20 includes: a purge water supply passage 34 which supplies purge water to the third sealing unit 20; and a purge water discharge passage 36 which discharges the purge water wp supplied to the third sealing unit 20.

According to the above-described configuration, the first sealing unit 16 forms the non-contact-type sealing surface s1, so that when fluid f which intrudes from the inside of the apparatus through the fluid leakage passage Pl flows through the sealing surface s1, the pressure of the fluid f is reduced sufficiently. Consequently, the second sealing unit 18 does not have to assume a pressure reduction action and can thereby prevent leakage by adopting the contact-type sealing surface s2 which has a leakage prevention effect. In this way, the second sealing unit 18 can substantially prevent leakage of the fluid f which has intruded into the fluid leakage passage Pl, so that any fluid leaked from the first sealing unit 16 will not reach the third sealing unit 20. The purge water wp is supplied from the purge water supply passage 34 to the third sealing unit 20 and this purge water lubricates and cools down the sealing surface s3, so that a sealing function can be maintained. Furthermore, since the third sealing unit 20 has the contact-type sealing surface s3, it can prevent leakage of any leaked fluid if by any chance such leaked fluid should reach the third sealing unit 20.

The multistage shaft sealing apparatus 10 can be applied as a sealing apparatus for pumps according to one embodiment. For example, the multistage shaft sealing apparatus 10 can be provided in a cooling system for a nuclear reactor and be applied to, for example, a primary coolant pump which handles a high-temperature and high-pressure fluid.

Referring to FIG. 1, a rotary machine 80 according to one embodiment includes: the rotating shaft 12; and the multistage shaft sealing apparatus 10 provided on the outer peripheral side of the rotating shaft 12 or the rotating member which rotates with the rotating shaft 12.

Since the rotary machine 80 includes the multistage shaft sealing apparatus 10 according to some of the above-described embodiments, it can suppress leakage of the high-temperature and high-pressure fluid f from a sealing unit provided between the rotating shaft 12 and the housing 14 (for example, a multistage shaft sealing unit composed of the first sealing unit 16, the second sealing unit 18, and the third sealing unit 20) even when the injection of the sealing water ws has stopped upon emergency such as an SBO. Therefore, it becomes unnecessary to provide a shutdown seal. Therefore, the configuration of the sealing units can be simplified and costs can be controlled to achieve low costs.

The rotary machine 80 can be applied to, for example, a primary coolant pump.

Referring to FIG. 1, one embodiment includes: a sealing water injection passage 38 which supplies the sealing water ws to the fluid leakage passage Pl at a position closer to the inside of the apparatus than the first sealing unit 16; and a sealing water discharge passage 39 provided so as to communicate with the fluid leakage passage Pl between the first sealing unit 16 and the second sealing unit 18. Since the pressurized sealing water ws is supplied from the sealing water injection passage 38 to the fluid leakage passage Pl during normal operation, it is possible to suppress intrusion of the fluid f which attempts to flow from the inside of the apparatus into the fluid leakage passage Pl. The sealing water ws supplied from the sealing water injection passage 38 passes through the fluid leakage passage Pl and is then discharged from the sealing water discharge passage 39.

According to this embodiment, the sealing water ws supplied from the sealing water injection passage 38 can prevent the fluid f inside of the apparatus from flowing into the first sealing unit 16 during the normal operation; and since the sealing water discharge passage 39 is provide between the first sealing unit 16 and the second sealing unit 18, the sealing water ws can be discharged to outside of the housing 14 without passing through the second sealing unit 18. As a result, the sealing surface s2 of the second sealing unit 18 can be formed as a contact type and eliminate the fluid f passing through it.

According to one embodiment as illustrated in FIG. 1, the sealing water injection passage 38 is located at a position closer to the inside of the apparatus than the first sealing unit 16 and is provided at a flange 15 adjacent to the first sealing unit 16. As a result, the sealing water ws supplied from the sealing water injection passage 38 can block the fluid leakage passage Pl between the first sealing unit 16 and the inside of the apparatus.

One embodiment includes a sealing water supply unit 40. The sealing water supply unit 40 includes a sealing water circulation passage 42 coupled to the sealing water injection passage 38 and the sealing water discharge passage 39; and the sealing water circulation passage 42 is equipped with a tank 44 capable of storing the sealing water ws. A pump 46 is provided in the sealing water circulation passage 42 between the tank 44 and the sealing water injection passage 38. The sealing water ws stored in the tank 44 is pressurized by the pump 46 and supplied via the sealing water injection passage 38 to the fluid leakage passage Pl. The sealing water ws supplied to the fluid leakage passage Pl passes through the sealing surface s1 of the first sealing unit 16 and is returned to the tank 44 via the sealing water discharge passage 39.

One embodiment as illustrated in FIG. 1 includes a purge water supply unit 50 for supplying purge water wp (for example, pure water) to the third sealing unit 20 via the purge water supply passage 34. The purge water supply unit 50 is configured by including a purge water head tank 52 and a connecting passage 54 coupled to the purge water head tank 52 and the purge water supply passage 34.

The purge water wp stored in the purge water head tank 52 is supplied to the fluid leakage passage Pl upstream from the third sealing unit 20 via the connecting passage 54 and the purge water supply passage 34. The sealing surface s3 is kept lubricated and is cooled down by supplying the purge water wp to the third sealing unit 20. Consequently, a sealing function of the third sealing unit 20 can be maintained. The purge water wp supplied to the third sealing unit 20 is discharged to a drain tank 58 via the purge water discharge passage 36.

According to one embodiment, the purge water head tank 52 is mounted at a higher place than the multistage shaft sealing apparatus 10. Then, the purge water wp is supplied to the third sealing unit 20 by using a water head difference between the purge water head tank 52 and the third sealing unit 20.

As a result, a power unit such as a pump becomes unnecessary, so that power reduction and cost reduction can be realized.

According to one embodiment, a fluid leakage off-line 60 coupled to the fluid leakage passage Pl downstream from the third sealing unit 20 is provided so as to communicate with the fluid leakage passage Pl.

Although the fluid f which leaks from the sealing surface s3 of the third sealing unit 20 to outside of the apparatus will be substantially eliminated as described above according to each of the aforementioned embodiments, the fluid leakage off-line 60 is provided by assuming a possibility that the fluid f might leak from the sealing surface s3. The fluid leakage off-line 60 is coupled to the drain tank 58 and the fluid f leaked from the sealing surface s3 is discharged to the drain tank 58 via the fluid leakage off-line 60.

According to one embodiment, the contact-type sealing surfaces s2 and s3 formed at the second sealing unit 18 and the third sealing unit 20 are configured so that the fluid f will not pass through them at least during the normal operation. A sealing surface pressure generated at the contact-type sealing surface s2 formed between the second runner 26 and the second sealing ring 28 of the second sealing unit 18 and at the contact-type sealing surface s3 formed between the third runner 30 and the third sealing ring 32 of the third sealing unit 20 is normally determined based on, for example, the difference in pressures between the upstream side and the downstream side of the sealing surface and a pressing formed applied to the runner or the sealing ring. Then, the sealing effect is influenced by a degree of this sealing surface pressure.

According to this embodiment, the second sealing unit 18 and the third sealing unit 20 can prevent the leakage of the fluid f during the normal operation and the second sealing unit 18 can also prevent the leakage of the high-temperature and high-pressure fluid f even when the injection of the sealing water ws has stopped upon emergency such as the occurrence of an SBO.

According to one embodiment, the second sealing ring 28 of the second sealing unit 18 is equipped with a biasing member 62 which applies an elastic force towards the second runner 26. Furthermore, the third sealing ring 32 of the third sealing unit 20 is equipped with a biasing member 64 which applies an elastic force towards the third runner 30. The biasing members 62 and 64 are composed of, for example, spring members like coil springs. The sealing surfaces which will not allow the fluid f to pass through at least during the normal operation can be formed by adjusting the elastic force of the biasing members 62 and 64.

Conventionally, the contact-type sealing surface is configured, despite what it is called, so that when the pressure of the upstream side of the sealing surface becomes relatively high, leakage is normally allowed to avoid the pressure of the upstream side from becoming excessively high. Alternatively, a bypass path which connects the upstream side and the downstream side of the sealing unit so as to allow communication between them is provided as another means for avoiding the occurrence of the high pressure.

According to one embodiment, the contact-type sealing surface s2 formed at the second sealing unit 18 is configured so that when a temperature of the fluid f reaching the sealing surface s2 is 310□ or lower and a pressure of the fluid f is 17.5 MPa or less, a flow rate of the fluid f passing through the sealing surface s2 becomes 1 m³/hr or less.

According to this embodiment, the second sealing unit 18 can substantially suppress the leakage of the high-temperature and high-pressure fluid f even when the high-temperature and high-pressure fluid fat the temperature of 310□ or lower and with the pressure of 17.5 MPa or less reaches the second sealing unit 18.

In one embodiment, the second runner 26 which forms the sealing surface s2 capable of suppressing the leakage of the high-temperature and high-pressure fluid f is composed of, for example, a highly-rigid material(s) such as a sintered hard alloy.

According to one embodiment, the second sealing unit 18 does not include a bypass path 66 that bypasses the second sealing unit 18 and couples the fluid leakage passage Pl upstream from the second sealing unit 18 to the fluid leakage passage Pl downstream from the second sealing unit 18 so as to communicate between them.

When the sealing unit has the contact-type sealing surface and the leakage of the fluid from the relevant sealing surface is substantially eliminate, a bypass path like the bypass path 66 illustrated in FIG. 1, which connects the upstream side and the downstream side of the sealing surface so as to allow communication between them, is normally provided in order to prevent the pressure of the upstream side from becoming excessively high as a result of eliminating the flow of the fluid.

On the other hand, according to the above-described embodiment, the pressure of the fluid f is sufficiently reduced by the first sealing unit 16 as described earlier, so that even when the second sealing unit 18 has the contact-type sealing surface s2, the pressure of the upstream side of the second sealing unit 18 will not become excessively high. Therefore, there is no need to provide the bypass path 66 which bypasses the second sealing unit 18.

One embodiment does not include a shutdown seal for emergency purposes which operates to close the fluid leakage passage Pl in response to the temperature or pressure of the fluid f when the temperature or pressure of the fluid f flowing into the fluid leakage passage Pl reaches a certain temperature or pressure or higher.

According to some of the aforementioned embodiments, the multistage shaft sealing apparatus 10 can prevent the leakage of the high-temperature and high-pressure fluid even when the injection of the sealing water ws has stopped upon emergency such as the occurrence of an SOB. So, it is unnecessary to provide the shutdown seal. Therefore, the configuration of the multistage shaft sealing apparatus 10 can be simplified and costs can be controlled to achieve low costs.

Figure 2:
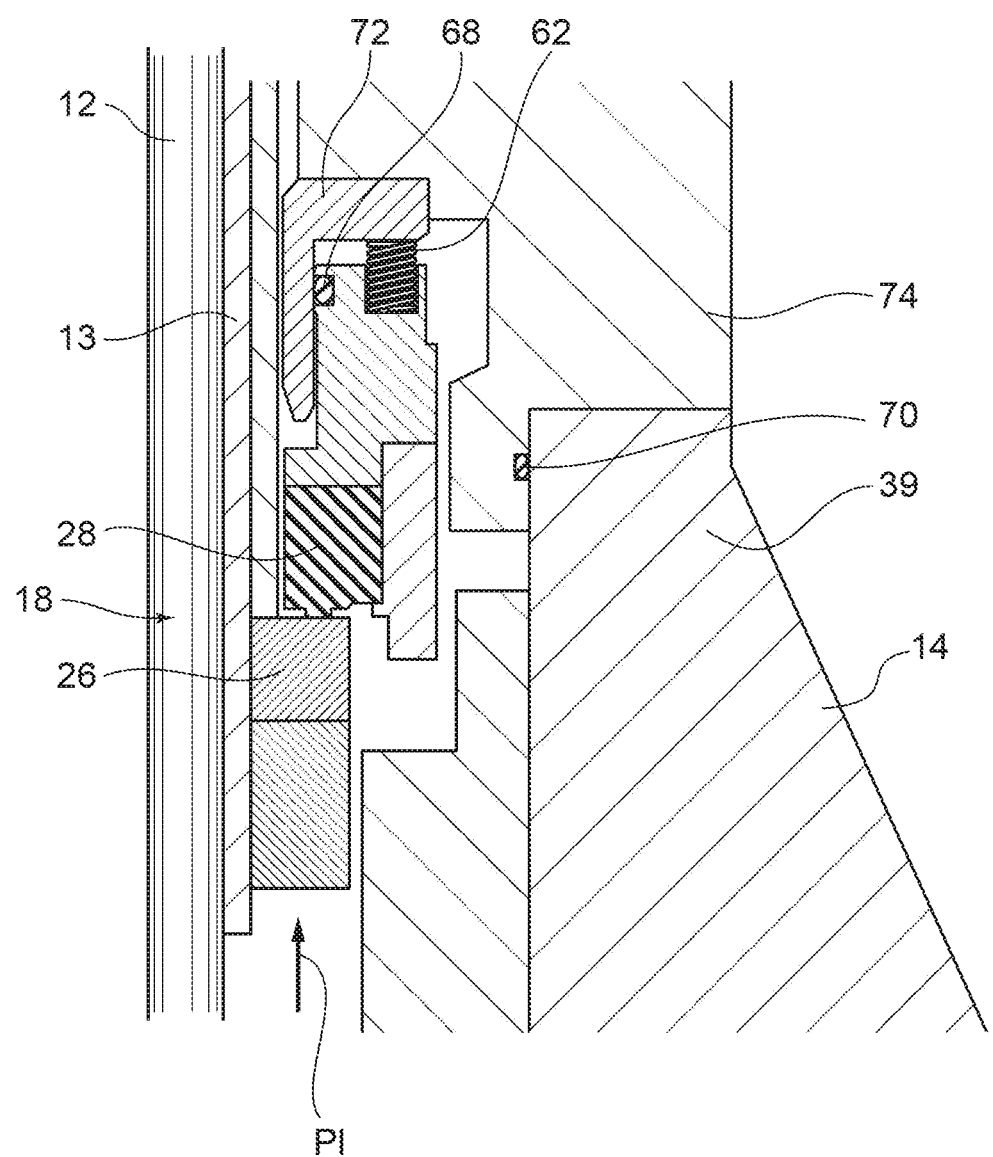
FIG. 2 is a longitudinal sectional view illustrating part of the multistage shaft sealing apparatus according to one embodiment.

FIG. 2 is a longitudinal sectional view of the second sealing unit 18 according to one embodiment. In this drawing, the sealing water discharge passage 39 is omitted.

According to one embodiment as illustrated in FIG. 2, an O-ring 68 or 70 is provided between the rotating shaft 12 (or a rotating member 13 when the rotating member 13 like a sleeve which rotates together with the rotating shaft 12 is provided on the outer peripheral surface of the rotating shaft 12) and the first sealing unit 16, the second sealing unit 18, or the third sealing unit 20 or between constituent elements such as the runner and the sealing ring that constitute the first sealing unit 16, the second sealing unit 18, or the third sealing unit 20 in order to seal between these members.

The O-rings 68 and 70 are composed of a heat-resistant material(s).

According to this embodiment, the effect of preventing the leakage of the high-temperature and high-pressure fluid between the respective members and the respective constituent elements can be maintained by composing the O-ring, which is interposed between the respective members and the respective constituent elements, of a heat-resistant material(s).

The O-rings 68 and 70 are composed of, for example, silicon rubber, fluorine-containing rubber, and ethylene-propylene rubber.

According to one embodiment, a sealing housing 74 constituting part of the housing 14 and an insert 72 extending between the rotating shaft 12 and the second sealing ring 28 are provided; and the insert 72 supports one side of the second sealing ring 28. The O-ring 68 is interposed between the second sealing ring 28 and the insert 72 and the O-ring 70 is interposed between the housing 14 and the sealing housing 74.

Since the O-rings 68 and 70 which are resistant to heat are provided between the respective members, the effect of preventing the leakage of the high-temperature and high-pressure fluid between the respective members can be maintained.

INDUSTRIAL APPLICABILITY

The multistage shaft sealing apparatus according to some embodiments can be applied to, for example, rotary machines in general such as pumps and prevent the leakage of the fluid to outside of the apparatus by a simply means without using a shutdown seal even upon emergency such as the occurrence of an SBO when the injection of the sealing water has stopped.

The invention claimed is:

1. A multistage shaft sealing apparatus provided on an outer peripheral side of a rotating shaft or a rotating member that rotates with the rotating shaft,
   the multistage shaft sealing apparatus comprising:
   a first sealing unit;
   a second sealing unit;
   a third sealing unit; and
   a housing located to surround the rotating shaft or the rotating member,
   wherein the first sealing unit, the second sealing unit and the third sealing unit are provided, in a sequential order with the first sealing unit located closest to inside of the apparatus and the third sealing unit located farthest from the inside of the apparatus, in a fluid leakage passage generated between the housing and the rotating shaft or the rotating member,
   wherein the first sealing unit is configured by including a first runner secured to the rotating shaft or the rotating member and a first sealing ring that is secured to the housing and forms a non-contact-type sealing surface with the first runner;
   wherein the second sealing unit is configured by including a second runner secured to the rotating shaft or the rotating member and a second sealing ring that is secured to the housing and forms a contact-type sealing surface with the second runner; and
   wherein the third sealing unit is configured by including a third runner secured to the rotating shaft or the rotating member and a third sealing ring that is secured to the housing and forms a contact-type sealing surface with the third runner; and
   the multistage shaft sealing apparatus further comprises:
   a purge water supply passage supplying purge water to the third sealing unit; and
   a purge water discharge passage discharging the purge water supplied to the third sealing unit, the housing includes:
   a first housing; and
   a second housing disposed on a side closer to the inside of the apparatus than the first housing such that the second housing is engaged with the first housing on an outer peripheral side of the second sealing unit,
   the second sealing unit includes:
   an insert disposed between the first housing and the second sealing ring to support the second sealing ring from a side of an outside of the apparatus;
   a biasing member disposed between the insert and the second sealing ring to apply biasing force to the second sealing ring toward the second runner;
   a first O-ring disposed between radially facing surfaces of the insert and the second sealing ring; and
   a second O-ring disposed on an engagement portion between the first housing and the second housing.

2. The multistage shaft sealing apparatus according to claim 1, further comprising:
   a sealing water injection passage supplying sealing water to the fluid leakage passage at a position closer to the inside of the apparatus than the first sealing unit; and
   a sealing water discharge passage provided so as to communicate with the fluid leakage passage between the first sealing unit and the second sealing unit.

3. The multistage shaft sealing apparatus according to claim 1, wherein the contact-type sealing surface formed at the second sealing unit and the third sealing unit is configured so that the contact-type sealing surface will not let a fluid pass through at least during normal operation.

4. The multistage shaft sealing apparatus according to claim 1, wherein the contact-type sealing surface formed at the second sealing unit is configured so that when a temperature of a fluid reaching the sealing surface is 310° C. or lower and a pressure of the fluid is 17.5 MPa or less, a flow rate of the fluid passing through the sealing surface becomes 1 m3/hr or less.

5. The multistage shaft sealing apparatus according to claim 1, wherein the second sealing unit does not include a bypass path that bypasses the second sealing unit and couples the fluid leakage passage upstream from the second sealing unit to the fluid leakage passage downstream from the second sealing unit so as to allow communicate between them.

6. The multistage shaft sealing apparatus according to claim 1, comprising:
  a sealing water injection passage supplying sealing water to the fluid leakage passage at a position closer to the inside of the apparatus than the first sealing unit; and
  a sealing water discharge passage provided so as to communicate with the fluid leakage passage between the first sealing unit and the second sealing unit,
  wherein the fluid leakage passage includes a sealing-water flowing passage which extends from a connection point between the sealing water injection passage and the sealing-water flowing passage to a connection point between the sealing water discharge passage and the sealing-water flowing passage via the first sealing unit without passing through a shutdown seal that operates to close the fluid leakage passage in response to a temperature or pressure of a fluid flowing into the fluid leakage passage when the temperature or pressure of the fluid reaches a certain temperature or pressure or higher.

7. A rotary machine comprising:
  a rotating shaft; and
  the multistage shaft sealing apparatus stated in claim 1, and provided on the outer peripheral side of the rotating shaft or a rotating member that rotates with the rotating shaft.

8. The multistage shaft sealing apparatus according to claim 1, further comprising a flange to which the housing is attached such that the housing is located farther from the inside of the apparatus than the flange.

\* \* \* \* \*